No. 677,237.  
J. A. KEYES.  
CYCLOMETER.  
(Application filed Feb. 26, 1900.)  
Patented June 25, 1901.

(No Model.)

3 Sheets—Sheet 1.

WITNESSES:

INVENTOR  
James A. Keyes,  
BY Frankland James,  
ATTORNEY

No. 677,237. Patented June 25, 1901.
J. A. KEYES.
CYCLOMETER.
(Application filed Feb. 26, 1900.)
(No Model.) 3 Sheets—Sheet 2.

WITNESSES:
INVENTOR
James A. Keyes
BY
Frankland James
ATTORNEY

No. 677,237. Patented June 25, 1901.
J. A. KEYES.
CYCLOMETER.
(Application filed Feb. 26, 1900.)
(No Model.) 3 Sheets—Sheet 3.
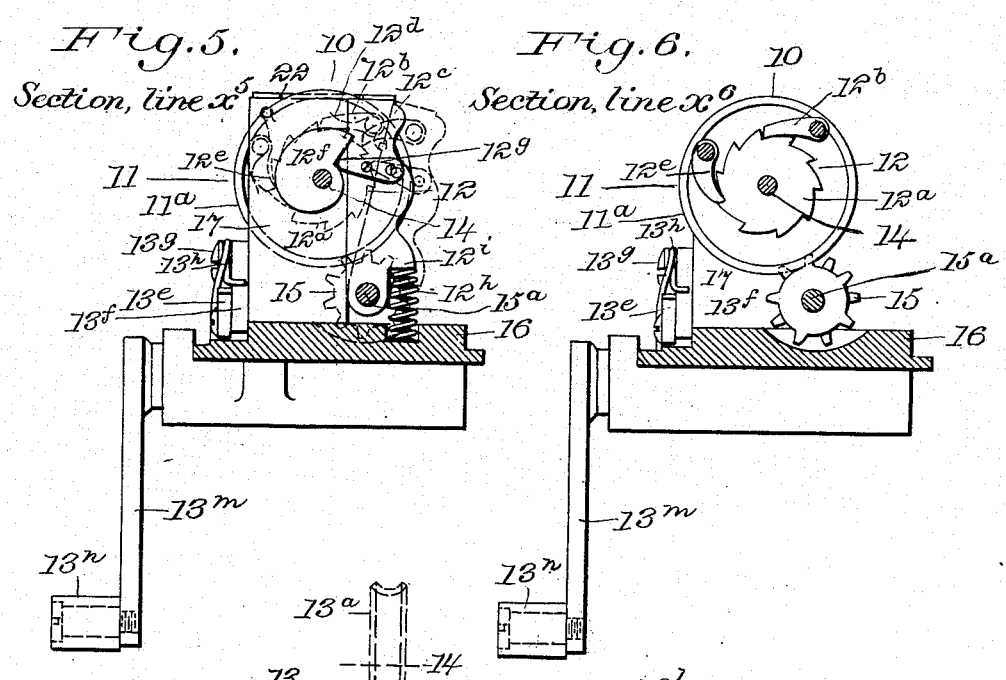
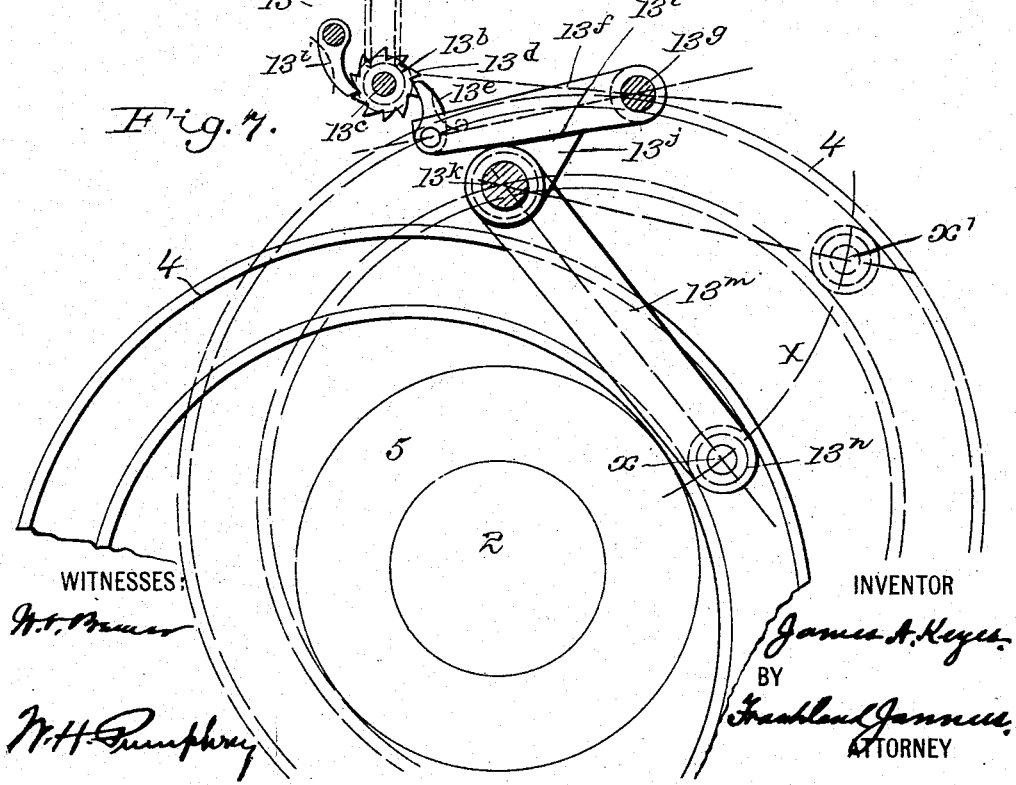
WITNESSES:
INVENTOR
James A. Keyes.
BY
Frankland Jannus,
ATTORNEY

UNITED STATES PATENT OFFICE.

JAMES A. KEYES, OF NEW YORK, N. Y.

CYCLOMETER.

SPECIFICATION forming part of Letters Patent No. 677,237, dated June 25, 1901.

Application filed February 26, 1900. Serial No. 6,460. (No model.)

*To all whom it may concern:*

Be it known that I, JAMES A. KEYES, a citizen of the United States of America, and a resident of New York, county of New York, State of New York, (whose post-office address is No. 656 Hudson street, New York, N. Y.,) have invented certain new and useful Improvements in Cyclometers, (Case A,) of which the following is a specification.

My invention relates generally to cyclometers, and is capable of use for all purposes for which such devices are ordinarily employed. In the present embodiment, however, the cyclometer is especially designed with a view to adapting it for use in connection with the larger class of vehicles—*i. e.*, those drawn by horses or power-driven and in which one axle and the wheels thereon, together with the body-supporting springs, are in fixed relation.

The novelty of the invention lies in the manner of mounting the cyclometer to permit of its being locked in operative position against removal by an unauthorized person, it at the same time being readily detachable for repair, examination, &c., by proper authority. Furthermore, the invention possesses novelty in the mechanism employed for transmitting motion from the vehicle-wheel positively, and when rotating in either direction to the registering device to cause the latter to respond by totalizing and indicating the entire distance traveled, and finally the invention embraces various main and subcombinations of parts to be hereinafter fully described and claimed.

The invention in its preferred form is illustrated in the accompanying drawings, throughout the several views of which like reference-numerals indicate corresponding parts.

Figure 1:
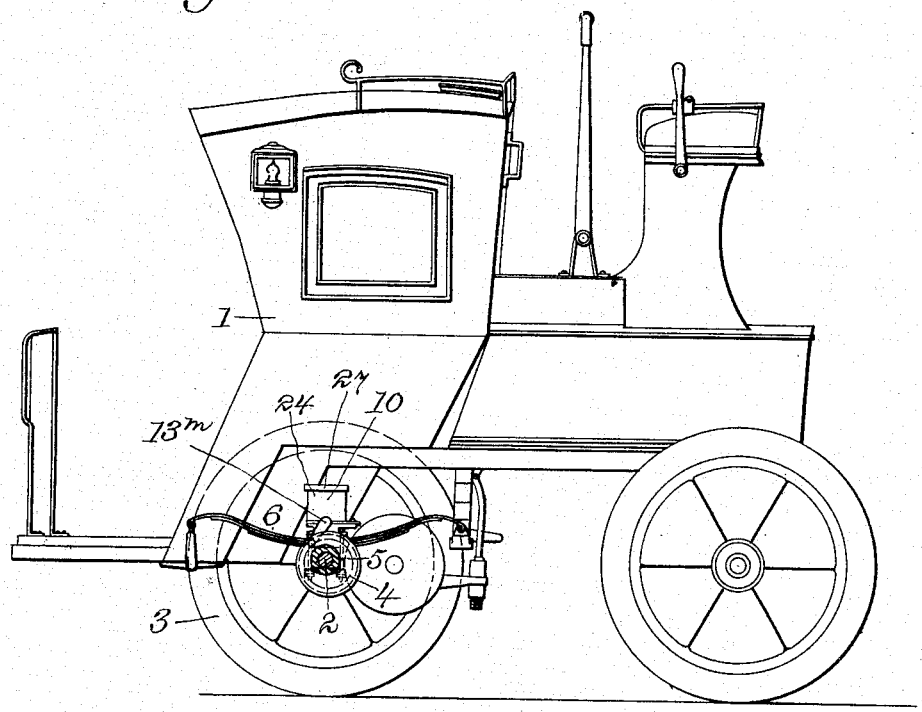
Figure 2:
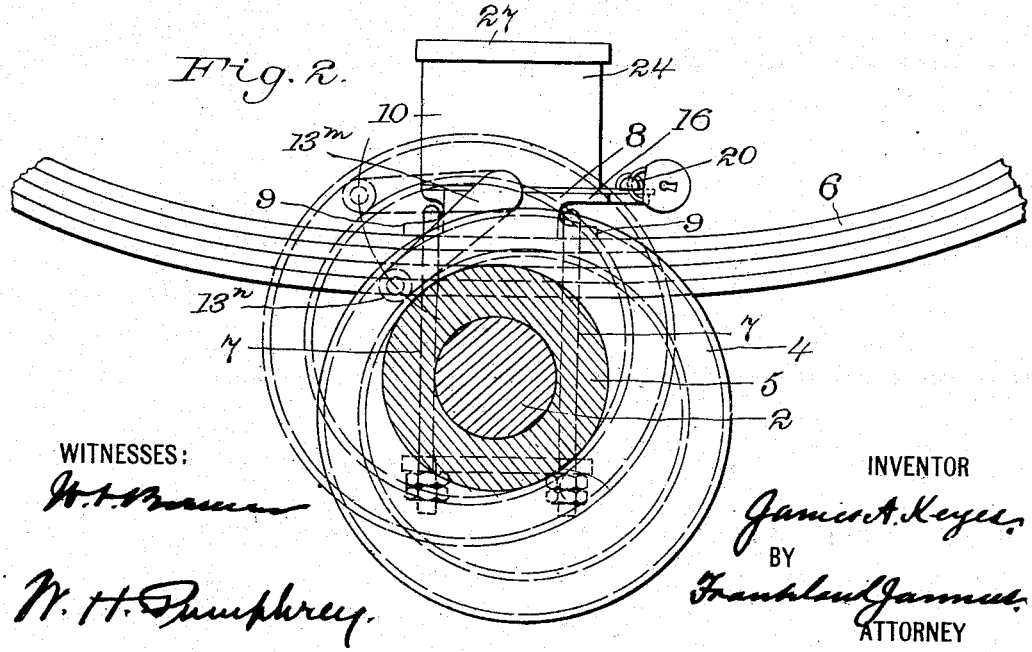
Figure 3:
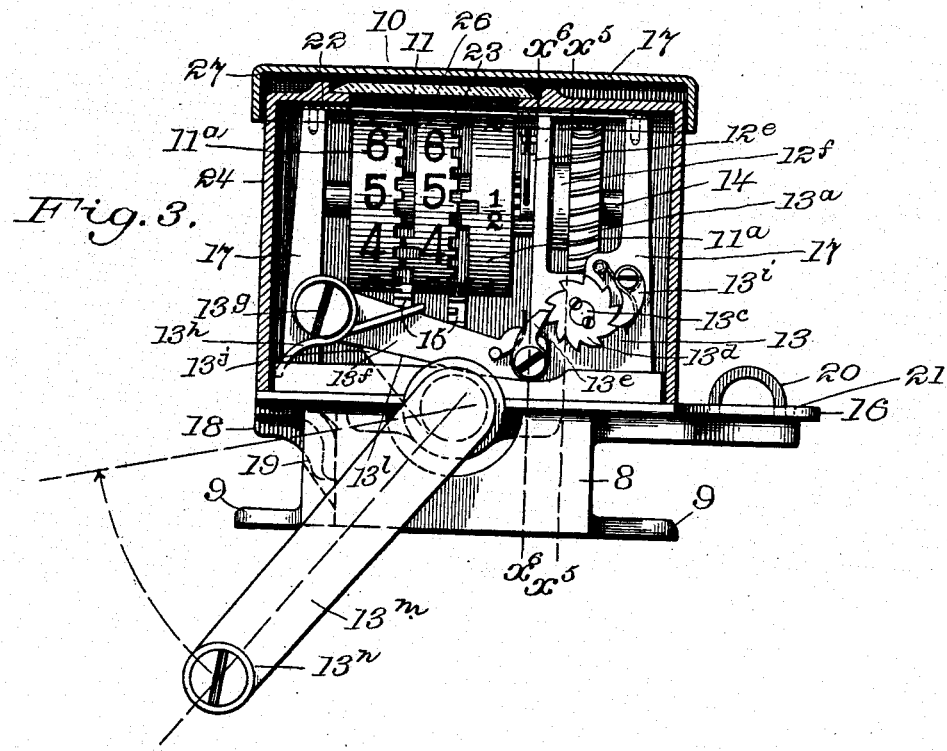
Figure 4:
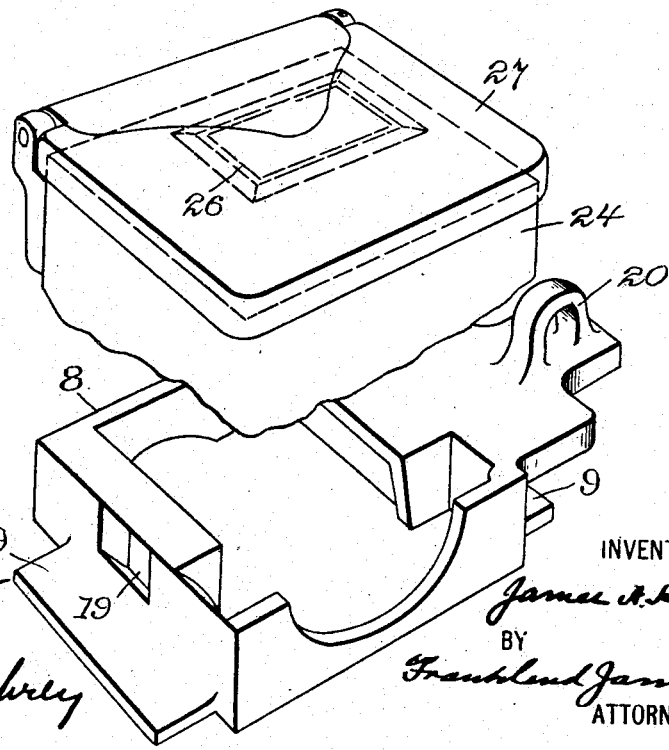

Referring to the drawings, Figure 1 is a view in elevation of an electrically-driven vehicle known as an "automobile," showing the cyclometer applied thereto, one of the forward wheels being removed to more clearly illustrate the relative arrangement of parts. Fig. 2 is an enlarged view in detail illustrating the manner of mounting the cyclometer upon the axle of the vehicle. Fig. 3 is a view showing the cyclometer mechanism in elevation and the upper cap or casing thereof in section. Fig. 4 is a view in perspective of the detachable base and the upper portion of the cap or casing. Fig. 5 is a sectional view taken on the line $x^5 x^5$ of Fig. 3 and showing the cyclometer removed from its base and casing. Fig. 6 is a similar view taken on the line $x^6 x^6$ of Fig. 3. Fig. 7 is a view in diagram illustrating the operation of the double-acting cam and relation of other parts of the gearing which connects the ratchet-feed with the vehicle.

In the drawings, 1 represents a power-driven vehicle of the class known as "automobiles." 2 represents the fixed axle, and 3 the wheels thereon. 4 represents an eccentric mounted upon the hub 5 of the wheel and keyed to rotate therewith. 6 represents one of the vehicle-springs arranged in fixed relation to the axle and through the medium of which the body is connected to and supported from the running-gear, the fastenings employed for the springs being the well-known form of clip-bolt 7.

8 represents a base-plate to which the cyclometer is detachably secured, and this is the preferred construction, although so far as the location and mode of securing to the vehicle are concerned the attachment of the base may be varied, if desired. This plate is provided at opposite ends with lugs 9 9 of a form suitable for taking under the clip-bolts, above referred to, by which they are clamped, and thus secured the base becomes practically a fixture and serves at all times to provide a seat for mounting a cyclometer.

10 represents the cyclometer which comprises a registering mechanism 11, a ratchet-feed device 12, and gearing 13, connecting the feed with the vehicle-wheel.

This register 11 may be of any suitable or well-known form and employ any number of indicating drums or wheels $11^a$. In the present instance, however, three wheels are shown loosely mounted upon a through-shaft 14. The wheel to the right is peripherally marked at four equispaced points with "½," "1," "1½," and "2" and designed to register half-miles. The central or intermediate wheel is peripherally marked from "1" to "10," inclusive, and serves to register units—*i. e.*, miles. The wheel to the left of the series is also marked from "1" to "10," inclusive, and registers tens. The adjoining edges of the rims of these wheels are suitably notched or toothed, and through coinciding notches are operatively connected by transfer-gearing 15 in a well-known manner to indicate addition. (In this instance from zero up to one hundred miles.)

The feed for the register comprises a ratchet-wheel 12$^a$, which is keyed or otherwise fixed to rotate with the register-wheel to the right of the series. The ratchet is advanced step by step through a pawl 12$^b$, carried by a rocker-arm 12$^c$, which latter is mounted loosely upon the shaft 15$^a$, carrying the transfer-gearing of the register. The feed-pawl is sustained in operative relation to the ratchet by a spring 12$^d$, and back play of the ratchet is prevented by the locking-pawl 12$^e$. The rocker-arm is oscillated by a cam 12$^f$, mounted upon shaft 14 and acting upon a fixed stud or projection 12$^g$ thereof, and is retracted by means of a spring 12$^h$, acting against a projecting heel 12$^i$ thereof, as is best shown in Fig. 5.

The gearing connecting the ratchet-feed with the vehicle comprises the worm-gear 13$^a$, which is loose on shaft 14 and is keyed or otherwise secured to cam 12$^f$, so that the gear and cam rotate together. The gear 13$^a$ meshes with and is driven by a worm 13$^b$, fixed on and rotating with shaft 13$^c$, which latter has also mounted upon its outer end a ratchet 13$^d$, Fig. 7. This ratchet is advanced by a spring-pressed pawl 13$^e$, carried by an arm 13$^f$, which is pivoted at 13$^g$ and sustained normally in a retracted position by a spring 13$^h$. Back play of the ratchet is prevented by a spring-pressed locking-pawl 13$^i$, which engages it continuously and limits its movement to rotation in one direction. The arm 13$^f$ is elevated against the action of its spring by a single lift-cam 13$^j$ to cause the dog to advance the ratchet. The cam consists of an approximately V-shaped projection from shaft 13$^k$, which provides an inclined face 13$^l$ for engagement with the arm 13$^f$. Upon the outer end of the cam-shaft a crank-arm 13$^m$ is fixed and is provided with a stud or anti-friction-roller 13$^n$, which latter is engaged by the eccentric or cam 4 upon the hub 5 of the vehicle-wheel.

The eccentric or cam 4 is secured about or to the inner portion of the hub of the wheel in any convenient manner and is of the inside-cam type, being provided with a continuous groove adapted to receive the roller 13$^n$ of the crank-arm 13$^m$, as indicated in Figs. 1, 2, and 7, and to positively move the arm during its revolution in whichever way the vehicle is traveling, the roller 13$^n$ following its path in the cam during either the forward or backward travel of the vehicle.

Referring to Fig. 7, the crank-arm is shown in its normal position. When the vehicle is traveling either forward or rearward, the arm oscillates in the arc X between points $x\ x'$. This movement of the crank-arm is effected by the action of the eccentric above referred to.

The mechanism of the cyclometer is mounted upon a plate 16, from which a series of uprights 17 17 17 rise to provide bearings for the several shafts mentioned. This plate conforms substantially in outline to the upper surface of the detachable base and is provided with a curved lug 18, which enters an inclined socket or opening 19 of the base and forms a hinge connection which is detachable only when the fastening at the opposite end of the plate is disengaged. This fastening comprises an integral staple 20, projecting from the base and upward through an opening 21, formed in the plate, which latter is secured, preferably, by a padlock or bolt engaging the staple.

22 represents a plate which is apertured at 23 to expose in a line one number of each disk.

The entire cyclometer mechanism is inclosed by a casing 24, which is detachably secured to the plate 16 and is provided with a glazed sight-opening 26, coinciding with the aperture in plate 22, also with a hinged spring-closing cover 27, which on being swung back in opposition to the spring gives access to the sight-opening, through which the distance indicated by the register is exposed and may be read.

The operation is as follows: The base being in position the cyclometer is connected therewith by first entering the curved lug in the inclined opening 19 of the base and then swinging the plate about the joint thus formed as a pivot until it rests upon the base, with the staple projecting through the aperture thereof. Assuming that the casing is properly secured to inclose the mechanism, it only remains to place the lock in position to engage the staple. Thus secured on the forward or rearward travel of the vehicle the crank-arm will be oscillated and through the cam motion will be transmitted to the spring-retracted pawl-carrying arm, causing the pawl to advance the ratchet, which in turn actuates the worm-gearing, and through the cam in part therewith the feed-pawl is caused to periodically advance the ratchet of the first or right-hand wheel of the series. From this wheel motion is imparted at regulated intervals through the transfer-gearing to the next wheels of higher order to indicate addition, as previously stated. These register-wheels are limited to rotate in only one direction by the locking-pawl engaging the ratchet of the first disk of the series.

It will be understood that I do not wish to limit myself to the exact construction and relation of parts, as herein illustrated and described, as various changes might be made in the details or the general arrangement, or mechanical equivalents might be substituted for one or more parts here employed, and in adapting such equivalents for use in connection with the present mechanism more or less rearrangement or reconstruction may be required; but I consider all such changes as immaterial modifications and entirely within the scope of my invention.

Having therefore described the invention, I claim—

1. In a vehicle, the combination with a non-rotating axle thereof, the wheel thereon, said wheel being provided with an engaging projection, of a cyclometer-supporting base mounted upon the axle, clip-bolts engaging the cyclometer-base and axle, and securing them permanently together, and the cyclometer attachable and detachable from the supporting-base and operatively arranged with said wheel projection by attachment to said base.

2. In a vehicle, the combination with a non-rotating axle and a casing adapted to contain a cyclometer mechanism, of a base or support therefor, projections extending from the lower part of said casing and adapted to engage the said base to detachably secure the casing thereto, and a pair of lugs extending from the lower part of the base and adapted to be engaged by clip-bolts whereby it is permanently secured in position upon the axle.

3. In a vehicle, the combination with a non-rotating axle, clip-bolts engaging the axle, a base-plate adapted to be also engaged by said clip-bolts and thereby permanently secured upon the axle, and a cyclometer-casing registering with the upper face of the base-plate and provided with integral means adapted to connect the cyclometer and base in adjusted relation, and when engaged therewith to be in desired operative position and detachable therefrom.

4. The combination with the axle of a vehicle and clip-bolts upon the same, of a base-plate having extended parts engaged and secured in position by said clip-bolts upon the axle and having a recess at one end and a staple at the other, a cyclometer-casing formed with a lug at one end adapted to register with the recess in the upper part of the base and a slotted lug extending from the casing and adapted to pass over the staple as the casing is adjusted into operative position upon the base, and means for securing the casing detachably in position.

Signed by me at New York, N. Y., this 24th day of February, 1900.

JAMES A. KEYES.

Witnesses:
W. L. BREMER,
FRANKLAND JANNUS.